US008348419B2

(12) United States Patent
Wolanski et al.

(10) Patent No.: US 8,348,419 B2
(45) Date of Patent: Jan. 8, 2013

(54) VARIABLE DATA PRINTING SYSTEM

(75) Inventors: Tania Wolanski, Boulder, CO (US); Joseph A. Spencer, Longmont, CO (US)

(73) Assignee: Info Print Solutions Company, LLC, Boulder, CO (US)

(*) Notice: Subject to any disclaimer, the term of this patent is extended or adjusted under 35 U.S.C. 154(b) by 406 days.

(21) Appl. No.: 12/641,661

(22) Filed: Dec. 18, 2009

(65) Prior Publication Data

US 2011/0149005 A1 Jun. 23, 2011

(51) Int. Cl.
*B41J 2/01* (2006.01)
*G06K 15/02* (2006.01)

(52) U.S. Cl. ....................................... 347/107; 358/1.12

(58) Field of Classification Search .................. 347/107; 358/1.12
See application file for complete search history.

(56) References Cited

U.S. PATENT DOCUMENTS

| | | | | |
|---|---|---|---|---|
| 6,199,765 | B1 | 3/2001 | Uhling | |
| 6,924,906 | B1 | 8/2005 | Schwier et al. | |
| 7,066,669 | B2 | 6/2006 | Lugg | |
| 7,099,029 | B2 | 8/2006 | Hopper | |
| 7,108,183 | B1 | 9/2006 | Cox, Jr. | |
| 7,226,158 | B2 | 6/2007 | Moore et al. | |
| 2002/0012134 | A1 | 1/2002 | Calaway | |
| 2002/0054337 | A1 | 5/2002 | Makishima et al. | |
| 2002/0191208 | A1 | 12/2002 | Uemura et al. | |
| 2003/0133139 | A1 | 7/2003 | Robinson et al. | |
| 2004/0066527 | A1 | 4/2004 | Kloosterman et al. | |
| 2005/0151995 | A1 | 7/2005 | Hauser et al. | |
| 2006/0114500 | A1 | 6/2006 | Ha | |
| 2006/0238793 | A1 | 10/2006 | Akashi et al. | |
| 2006/0291018 | A1 | 12/2006 | Lang et al. | |
| 2007/0024882 | A1 | 2/2007 | Hoffman et al. | |
| 2007/0053004 | A1 | 3/2007 | Calaway | |
| 2007/0076234 | A1 | 4/2007 | Hopper et al. | |
| 2007/0098262 | A1 | 5/2007 | Malik et al. | |
| 2007/0120933 | A1 | 5/2007 | Mueller | |
| 2007/0297818 | A1* | 12/2007 | Yamada et al. | 399/38 |
| 2008/0074707 | A1 | 3/2008 | Cranitch et al. | |
| 2008/0144132 | A1* | 6/2008 | Koga | 358/475 |
| 2010/0007899 | A1* | 1/2010 | Lay | 358/1.6 |

FOREIGN PATENT DOCUMENTS

| | | |
|---|---|---|
| EP | 0802527 | 10/1997 |
| EP | 1587018 | 10/2005 |

OTHER PUBLICATIONS

"European Search Report", 10167382.0-2210, (Aug. 23, 2010), 6 pages.

Matsumoto, Takeshi , et al., "Development and Verification of a Collaborative Printing Environment", 0-7695-2806-6/07; *Creating, Connecting and Collaborating through Computing, 2007. C5 '07. The Fifth International Conference.*, (Jan. 2007), 8 pages.

* cited by examiner

*Primary Examiner* — Omar Rojas

(74) *Attorney, Agent, or Firm* — Blakely, Sokoloff, Taylor & Zafman LLP

(57) ABSTRACT

A printing system is disclosed. The printing system includes a first printer to print a first type of data to a medium and to print a barcode on the medium including variable data to be printed on the medium and a second printer to print the variable data to the medium based on the barcode. The second printer includes a barcode reader, transfer location and a medium path having a fixed distance between the barcode reader and the transfer location.

20 Claims, 4 Drawing Sheets

VARIABLE DATA PRINTING SYSTEM

FIELD OF THE INVENTION

The invention relates to the field of printing, and in particular, to printing variable data on documents.

BACKGROUND

In the printing industry, it is sometimes necessary to process media multiple times in order to create a final product. For example, media such as paper may be pre-printed in an offset press, then run through a digital press/printer in order to add unique (variable) information. In other instances, a digital printer may not have enough capability (e.g., an ink jet printer may not be able to print Magnetic Ink Character Recognition (MICR), or a monochrome printer may not be able to print color/highlight color).

In these cases, it may be necessary to process the media through multiple, independent digital printing devices in order to achieve the final product. To highlight their independence, the printing devices may be located in different buildings or countries and having no external network connection. Thus, the printed output may be processed immediately or hours or days apart.

Moreover, the second printing device that applies the MICR variable data is typically implemented with a third party post processor or is a third party post processor. However, such a solution requires the purchase of additional hardware from the third party vendor.

Accordingly, a single source integrated mechanism for processing media is desired.

SUMMARY

In one embodiment, a printing system is disclosed. The printing system includes a first printer to print a first type of data to a medium and to print a barcode on the medium including variable data to be printed on the medium and a second printer to print the variable data to the medium based on the barcode. The second printer includes a barcode reader, transfer location and a medium path having a fixed distance between the barcode reader and the transfer location In a further embodiment, a method is disclosed including printing a first type of data on a medium at a first printer, printing a barcode on the medium at the first printer including variable data to be printed on the medium, reading the barcode at a second printer and printing the variable data to the medium at the second printer based on the barcode.

In another embodiment, a printer is disclosed. The printer includes a barcode reader to read a barcode having variable data printed to a medium at a second printer, a transfer location to transfer the variable data to the medium based on the barcode and a paper path having a fixed distance between the barcode reader and the transfer location.

BRIEF DESCRIPTION OF THE DRAWINGS

A better understanding of the present invention can be obtained from the following detailed description in conjunction with the following drawings, in which.

DETAILED DESCRIPTION

A printing system is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
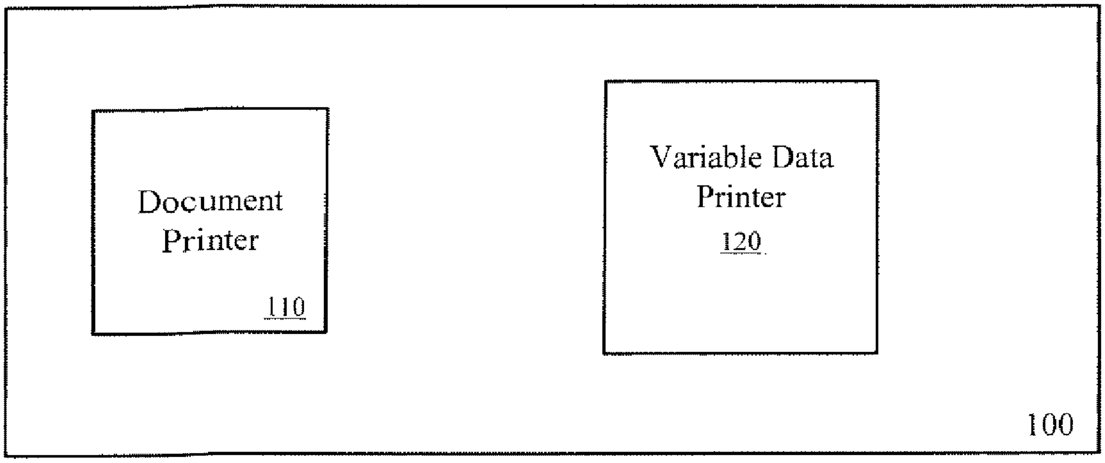
FIG. 1 illustrates one embodiment of a printing system.

FIG. 1 illustrates one embodiment of a printing system 100. Printing system 100 includes a printer 110 and a printer 120. According to one embodiment, document printer 110 is a high speed ink jet color printer that is implemented to print image and text data on paper. Additionally, printer 110 prints variable data, such as barcode or other machine readable data. In such an embodiment, printer 120 is a monochrome printer equipped with MICR toner.

In a further embodiment, printer 110 prints images and text data on check stock for a multitude of bank account holders. For example, printer 110 may print the address, phone number and other account holder specific data, along with one or more selected images, on each check that is printed. However, printer 110 may not have the capability to print other variable data, such as MICR, since the magnetic ink often clogs the print head of printer 110, or printer 110 does not have the capacity to accommodate MICR since it would require giving up one of the existing ink jet slots/colors for MICR placement. Thus, the MICR data is later printed on the check at printer 120.

In one embodiment, printer 110 prints a barcode on each document. In such an embodiment, two-dimensional (2D) barcode data includes all of the instructions to print the MICR data on at printer 120. For example, the barcode includes the MICR data (e.g., bank account numbers) that is to be applied to the document at printer 120, as well as the location of the MICR data on the document. In one embodiment, the data within the barcode is encrypted since the data may include confidential or sensitive information.

In a nearline embodiment, the printer 110 output is rewound and transferred to an unwinder (not shown) where it is fed into printer 120. Such an embodiment is implemented when the printer 110 and printer 120 print speeds cannot be synchronized. This format may also be used where printer 120 is required to work as an independent system processing jobs other than those first printed at printer 110. Further, this format may be used where available floor space would not allow for the footprint needed to combine systems.

In an embodiment where printer 110 and printer 120 print speeds can be synchronized (e.g., inline), the printers and can be positioned in-line with printer 110 output feeding directly into printer 120, thus eliminating the need for re-winding. Moreover, inline configuration enables the color/MICR data printing process to be further streamlined by minimizing the time for completion of print operations.

In one embodiment, an automated accumulator/festoon system can be placed between the end of printer 110 and before printer 120 to buffer the paper and allow for more seamless operation (e.g., eliminating the need for multiple start/stops). Further the system enables the coupling of print operations even when the speed of printer 110 and 120 are not perfectly synchronized.

Figure 2:
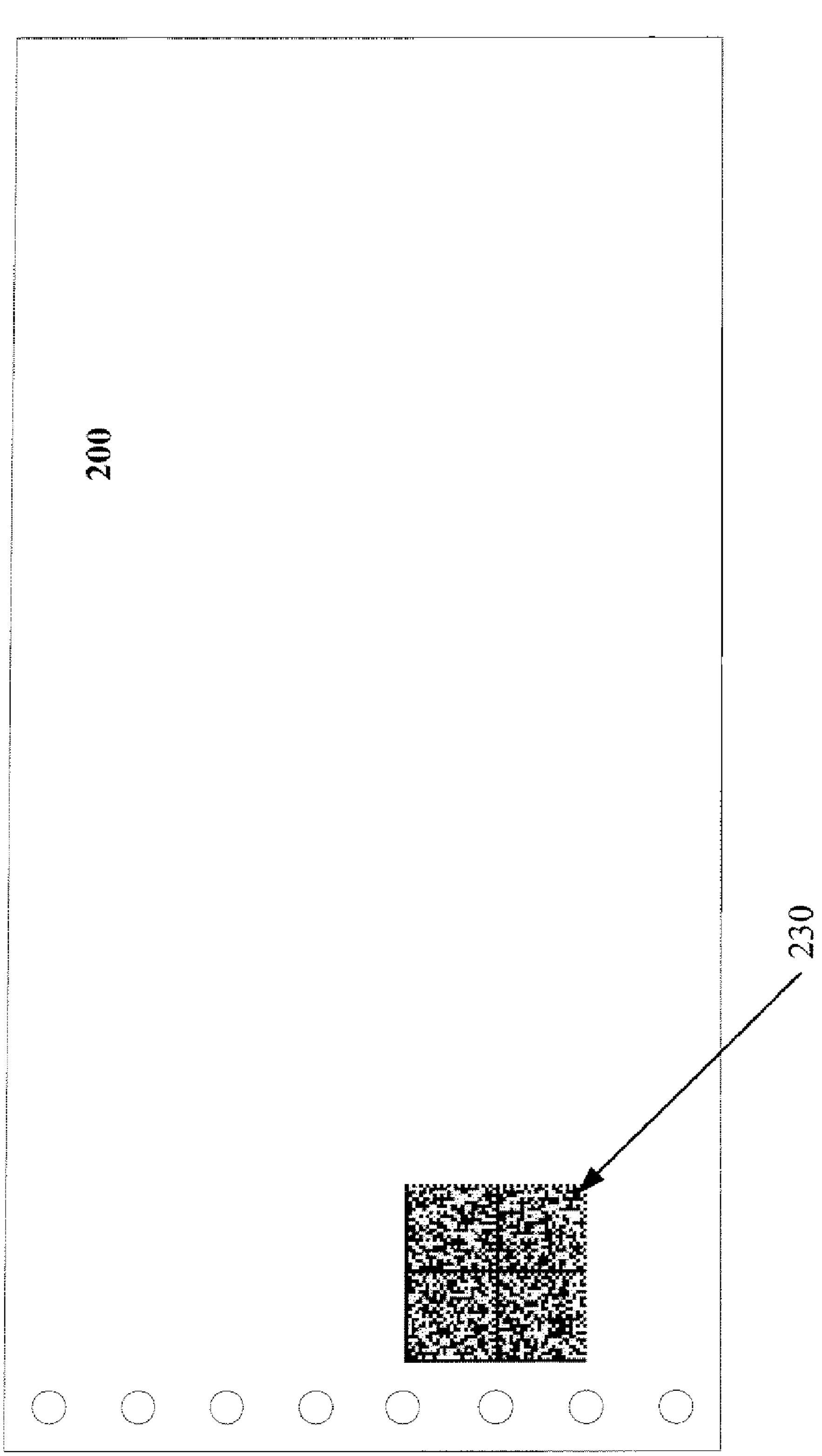
FIG. 2 illustrates one embodiment of a document.

FIG. 2 illustrates one embodiment of a document 200 after it has been processed at printer 110. Document 200 includes a 2D barcode 230. In other embodiments the document 200 paper may be tractored or pinless, not requiring tractor holes) that was printed at printer 110. At some later time the document is placed into printer 120 for printing of the MICR data. Printer 120 includes a barcode reader to read barcode 230 in order to retrieve the MICR data and positioning information for placement on the document.

Figure 3:
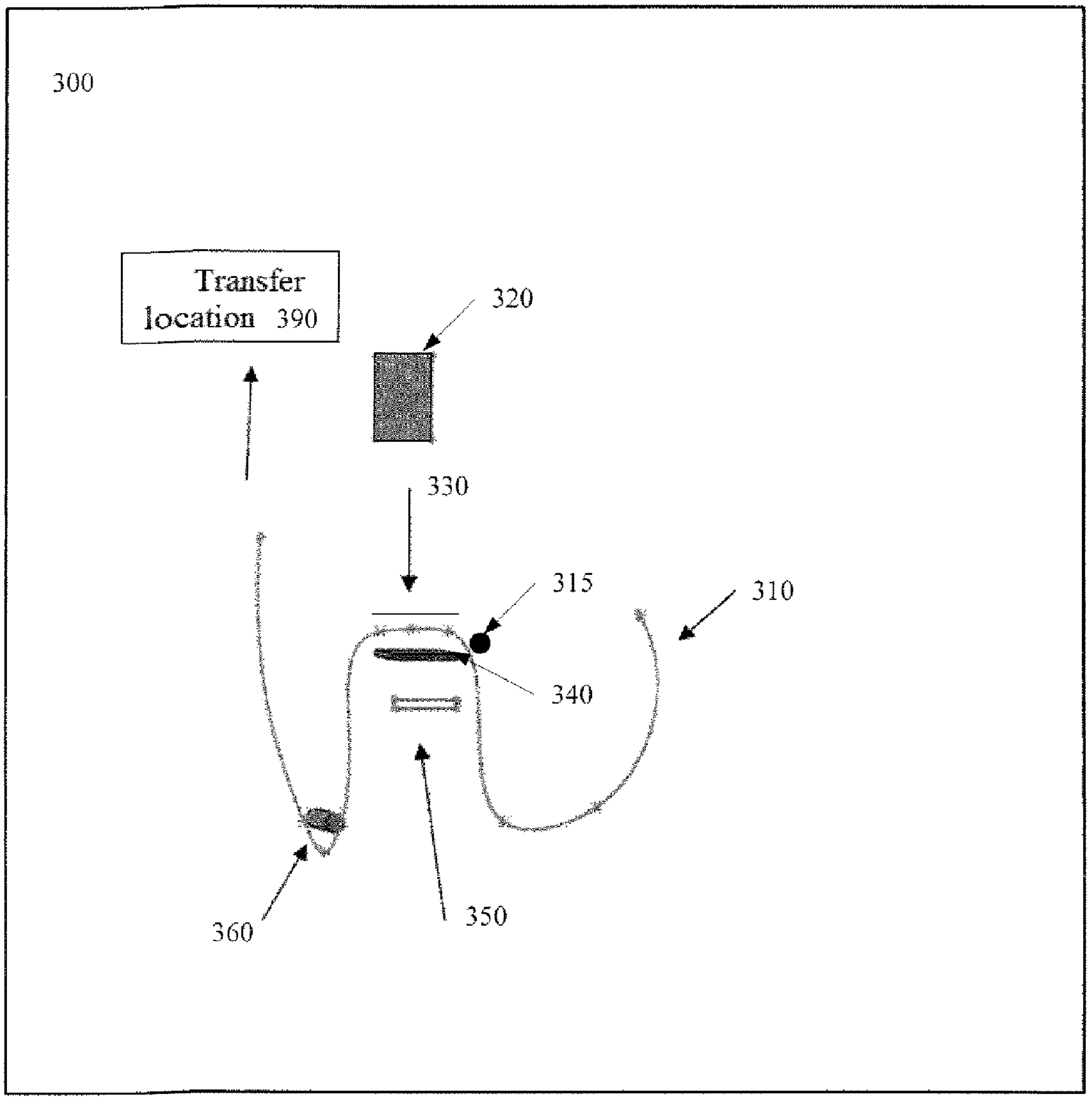
FIG. 3 illustrates one embodiment of a printer.

FIG. 3 illustrates one embodiment of a print engine 300 within MICR data printer 120. Print engine 300 includes a paper path 310, brake 315, barcode reader 320, cover plate 330, flat plate or surface 340, backlight 350, roller 360 and a transfer location 390. In one embodiment, paper path 310 is extended to enable barcode reader 320 to be mounted within print engine 300 at a fixed distance from the point of image transfer.

Barcode reader 320 reads the data from a 2D barcode applied to the paper at printer 110. In one embodiment, barcode reader 320 is a charge-coupled device (CCD) CCD camera. However in other embodiments, reader 320 may be a line scan, or other type of scanner. Print engine 300 subsequently translates and processes the data so that information from the incoming paper feed can be interpreted and printed onto the job in real time.

According to one embodiment, paper path 310 is extended and stabilized to ensure that the distance between the barcode read location and transfer location 390 is fixed in order to maintain registration between what is read and when it is printed. Having a fixed distance between barcode reader 320 and transfer location 390 enables printer 120 to rely on print speed to determine where to place the MICR data. For example if the barcode read location is exactly 56 inches before transfer location 390 and the printer is moving at 56 inches per second, printer 120 will be told to print the MICR data on a page that arrives at transfer location 390 exactly one second after the barcode is read.

For a central mounting location, enabling barcode reading 30-70 inches ahead of transfer location 390, paper path 310 is extended and stabilized to neutralize paper momentum during stop/start. However in other embodiments, the actual reading location may be closer or farther as needed. Paper path 310 is extended by flat plate 340 and one or more rollers 360. Flat plate 340 is implemented where the read surface in an embodiment where barcode reader 320 requires a flat read surface (e.g., CCD camera). In other embodiments, a roller or bar can be substituted for the flat plate for line scan barcode readers.

To neutralize momentum of the paper, brake 315 is utilized to create a solid stop in the paper so that, when the printer starts and stops, paper at this location is fixed and will not move forward or back except when actively driven by the printer. Brake 315 may be in the form of one or more suspended bars, weights, brushes, etc. Moreover, paper brake 315 may be modified to meet specific needs of the paper. When the printer drive mechanism stops the paper position at the read location becomes fixed, though the paper web ahead may become slack. When the printer engages and the web becomes taut again, the paper does not move at the read location until actively driven.

Since paper flutter can produce barcode read errors, an anti-flutter cover plate 330 is included above the flat plate 340 surface to prevent flutter. In one embodiment, cover plate 330 covers the paper in all but the barcode read location to serve as a mask so that reader 320 sees only the 2D barcode. In other embodiments, a plastic strip may be included within cover plate 330 to further reduce paper flutter. In a further embodiment, a backlight 350 is included to increase the contrast between the barcode and paper.

Figure 4:
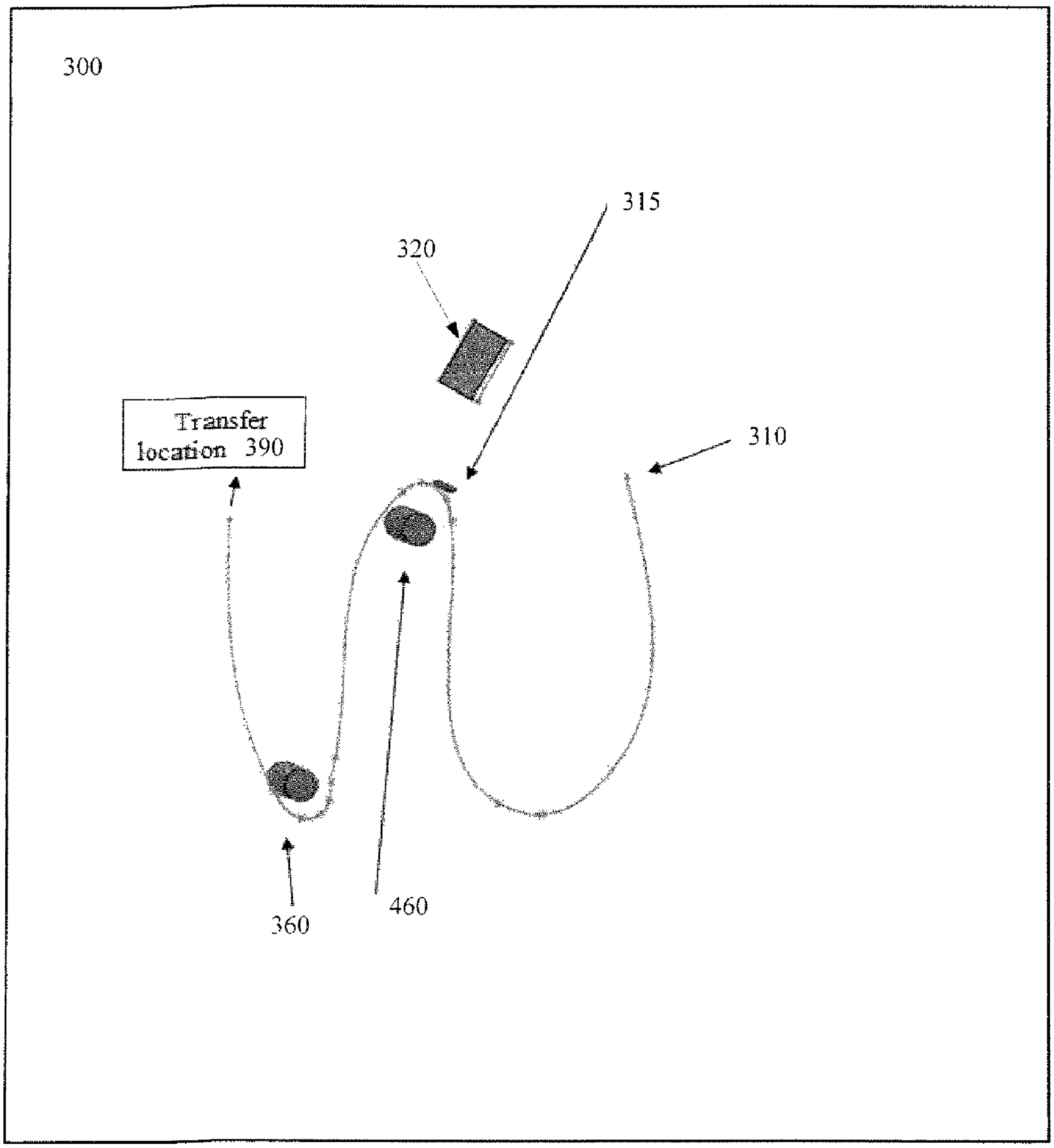
FIG. 4 illustrates another embodiment of a printer.

FIG. 4 illustrates another embodiment of a print engine 300 within MICR data printer 120 where paper path 310 is extended by rollers 360 and 460, as well as brake 315. In this embodiment, a curved roller 460 is implemented as the read surface and barcode reader 320 reads the paper at an angle. As discussed above, roller 460 may be used in embodiments where the reader 320 is a line scanner or other type of reader capable of reading the barcode on a curved surface and not requiring a flat plate.)

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A printing system comprising:

a first printer to print a first type of data to a medium and to print a barcode on the medium including variable data to be printed on the medium; and a second printer to print the variable data to the medium based on the barcode, the second printer having:

a barcode reader;

transfer location; and a medium path having a fixed distance between the barcode reader and the transfer location to determine placement of the variable data, wherein the location of the printed variable data is based on the print speed at the second printer and the fixed distance medium path.

2. The printing system of claim 1 wherein the second printer further comprises a medium path extension.

3. The printing system of claim 2 wherein the medium path extension comprises:

a flat plate; and a roller.

4. The printing system of claim 2 wherein the medium path extension comprises two or more rollers.

5. The printing system of claim 2 further comprising:

a drive mechanism to move the medium through the medium path; and a brake to prevent the medium from moving whenever the drive mechanism is not actively moving the medium.

6. The printing system of claim 5 wherein the brake comprises at least one of a bar, weight or brush.

7. The printing system of claim 5 further comprising a cover plate to prevent the medium from fluttering while the barcode reader is reading the barcode.

8. The printing system of claim 7 wherein the cover plate covers the medium except for a barcode read location so that the barcode reader only reads the barcode.

9. The printing system of claim 5 further comprising a backlight to increase contrast between the barcode and the medium.

10. The printing system of claim 1 wherein the first type of data comprises at least one of text data and image data.

11. The printing system of claim 10 wherein the variable data comprises Magnetic Ink Character Recognition (MICR) data.

12. A method comprising:

printing a first type of data on a medium at a first printer;

printing a barcode on the medium at the first printer including variable data to be printed on the medium;

reading the barcode at a second printer;

determining a print speed at the second printer; and printing the variable data to the medium at the second printer based on the barcode, wherein the location of the printed variable data is based on the print speed at the second printer and a fixed distance between a barcode reader and a transfer location at the second printer.

13. The method of claim 12 wherein the first type of data comprises at least one of text data and image data.

14. The method of claim 13 wherein the variable data comprises Magnetic Ink Character Recognition (MICR) data.

15. A printer comprising a print head having:

a barcode reader to read a barcode having variable data previously printed to a medium;

a transfer location to transfer the variable data to the medium based on the barcode; and a paper path having a fixed distance between the barcode reader and the transfer location to determine placement of the variable data, wherein the location of the printed variable data is based on the print speed at a second printer and the fixed distance paper path.

16. The printer of claim 15 wherein the print head further comprises a medium path extension.

17. The printer of claim 16 wherein the medium path extension comprises:

a flat plate; and a roller.

18. The printer of claim 17 further comprising:

a drive mechanism to move the medium through the medium path; and a brake to prevent the medium from moving whenever the drive mechanism is not actively moving the medium.

19. The printer of claim 18 further comprising a cover plate to prevent the medium from fluttering while the barcode reader is reading the barcode.

20. The printer of claim 19 further comprising a backlight to increase contrast between the barcode and the medium.

* * * * *